US011060538B2

(12) United States Patent
Poux et al.

(10) Patent No.: US 11,060,538 B2
(45) Date of Patent: Jul. 13, 2021

(54) ACTUATOR FOR AN AUTOMATED OR AUTOMATIC TRANSMISSION, AND METHOD FOR CONTROLLING THE ACTUATOR

(71) Applicant: WABCO GmbH, Hannover (DE)

(72) Inventors: Romain Poux, Hannover (DE); Timo Gerlach, Hannover (DE); Dennis Reimann, Hannover (DE)

(73) Assignee: WABCO GmbH, Hannover (DE)

( * ) Notice: Subject to any disclaimer, the term of this patent is extended or adjusted under 35 U.S.C. 154(b) by 104 days.

(21) Appl. No.: 16/497,971

(22) PCT Filed: Mar. 20, 2018

(86) PCT No.: PCT/EP2018/056978
§ 371 (c)(1),
(2) Date: Sep. 26, 2019

(87) PCT Pub. No.: WO2018/177802
PCT Pub. Date: Oct. 4, 2018

(65) Prior Publication Data
US 2021/0108656 A1 Apr. 15, 2021

(30) Foreign Application Priority Data
Mar. 29, 2017 (DE) ...................... 10 2017 003 017.0

(51) Int. Cl.
*F15B 15/22* (2006.01)
*F15B 11/048* (2006.01)
(Continued)

(52) U.S. Cl.
CPC .......... *F15B 15/226* (2013.01); *F15B 11/048* (2013.01); *F16H 61/30* (2013.01); *F16J 1/005* (2013.01)

(58) Field of Classification Search
CPC ............................ F15B 11/048; F15B 15/226
See application file for complete search history.

(56) References Cited

U.S. PATENT DOCUMENTS 4,700,611 A * 10/1987 Kaneko ................. F15B 15/227
188/284
5,138,838 A * 8/1992 Grosser ................. F15B 21/087
60/426

(Continued)

FOREIGN PATENT DOCUMENTS

DE 1155348 B 10/1963
DE 39311165 A1 3/1990
(Continued)

OTHER PUBLICATIONS

European Patent Office, Rijswijk, Netherlands, International Search Report of International Application No. PCT/EP2018/056978, dated Jul. 13, 2018, 2 pages.

*Primary Examiner* — Michael Leslie
(74) *Attorney, Agent, or Firm* — Dickinson Wright PLLC

(57) ABSTRACT

An actuator (1) for an automated or automatic transmission has a cylinder housing (3), a piston unit (2), and a piston rod (13). The piston unit (2) is coupled to the piston rod (13) and is arranged movably in the cylinder housing (3) along a longitudinal axis (4). The piston unit (2) separates two pressure chambers (8, 9) of variable volume in the cylinder housing (3). The pressure chambers are configured to load the piston unit (2) with compressed air on both sides. The two pressure chambers (8, 9) are connected to a valve unit (14) for switching between pressurization and purging of each of the two pressure chambers (8, 9). An end stop clamping device for damping at least one end stop of the piston unit (2) is arranged in the actuator (1). A pneumati- (Continued)

cally and a mechanically operating damping stage are provided improve the end stop damping device.

9 Claims, 5 Drawing Sheets

(51) Int. Cl.
   *F16H 61/30* (2006.01)
   *F16J 1/00* (2006.01)

(56) References Cited

U.S. PATENT DOCUMENTS

| | | | | |
|---|---|---|---|---|
| 5,252,042 | A * | 10/1993 | Yonezawa | F01B 11/02 |
| | | | | 417/401 |
| 7,387,061 | B2 * | 6/2008 | Kobata | F15B 11/048 |
| | | | | 60/461 |
| 7,493,848 | B2 * | 2/2009 | Horikawa | F15B 15/086 |
| | | | | 92/85 R |
| 10,202,988 | B2 * | 2/2019 | Stander | F15B 15/226 |
| 10,214,280 | B2 * | 2/2019 | Kondo | F15B 15/226 |

FOREIGN PATENT DOCUMENTS

| | | |
|---|---|---|
| DE | 19543646 A1 | 5/1997 |
| DE | 19604516 A1 | 8/1997 |
| DE | 102009029038 A1 | 3/2011 |
| DE | 102014018631 A1 | 6/2016 |
| DE | 112014006457 T5 | 12/2016 |
| EP | 2657541 A2 | 10/2013 |

\* cited by examiner

ACTUATOR FOR AN AUTOMATED OR AUTOMATIC TRANSMISSION, AND METHOD FOR CONTROLLING THE ACTUATOR

TECHNICAL FIELD

The present disclosure relates to an actuator for an automated or automatic transmission, having a cylinder housing, a piston unit and a piston rod, wherein the piston unit is coupled to the piston rod and is arranged movably in the cylinder housing along a longitudinal axis, wherein the piston unit separates from each other two pressure chambers of variable volume in the cylinder housing, by means of which the pressure chambers may be loaded with compressed air on both sides of the piston unit, wherein the two pressure chambers are connected to a valve unit which is able to switch between individually pressurizing and purging of each of the two pressure chambers, and wherein an end stop damping device for damping at least one end stop of the piston unit is arranged in the actuator. The present disclosure also relates to a method for controlling such an actuator.

BACKGROUND

Such actuators are used amongst others as gear selectors for automated or automatic transmissions in drive trains of motor vehicles, in order to engage and disengage gears. A known construction of such actuators is a so-called two-position or multi-position cylinder. Both are formed as piston-cylinder arrangements. In a two-position cylinder, at one end a linearly displaceable piston rod has a dual-acting piston, or a piston unit composed of several piston parts, which can be loaded with a fluid on both sides. The piston is loaded for example, with compressed air which flows under valve control into one of the two pressure chambers depending on the intended direction of the movement, while the respective other pressure chamber is purged. Outside the two-position cylinder, the piston rod has an interface for transmitting an actuating force to a shift element or similar of the transmission. The pressurization of the piston with the compressed air via the pressure chambers and the purging of the pressure chambers are controlled by a valve unit, wherein usually a valve is assigned to each of the pressure chambers, for example a direction control magnetic valve which opens or closes the connected pressure lines.

The acceleration and travel speed of such a piston is substantially determined by the mass flows of the compressed air for loading the one side and for purging the other side of the piston, wherein the mass flows depend on the cross-sectional areas of the lines and their respective openings. Further relevant parameters, in particular for the response behavior of the piston for performance of the piston movement, are a design-imposed dead volume and the mass and friction of the moving elements.

In such an operation, the piston and the piston rod travel back and forth at comparatively high speed. This movement is usually stopped at the end of the adjustment travel by an end stop fixed to the housing for the piston and/or the piston rod. The end stop absorbs the residual kinetic energy of the moving parts. The parts concerned are thereby heavily loaded. Frequent and powerful mechanical impacts at the end stop may reduce the maximum service life of shift elements, such as, for example, the shift lever and shift forks, and of gearbox components, for example, synchronization rings and gearwheels. Also, malfunctions can occur in the electric transmission control system. Loud stop noises and shift impacts adversely affect the shift comfort of the gearbox. In particular in a transmission, it therefore appears useful firstly to reduce the end stop speeds to a minimum in order to achieve a smooth movement, namely a stepped and/or continuous contacting of piston or piston rod on the end stop. This, however, leads to a conflict of objectives, since the actuators generate high travel speeds of the piston or piston rod in order to engage the transmission gears as quickly as possible, to achieve short shift times and to keep torque losses during the gear shifting to a minimum.

In the context of these problems, proposals have already been made for end stop damping or end position damping of a piston which is driven by a pressurized medium and is linearly movable in a cylinder housing. It is already known to damp a piston impact solely via elastic stops. However, the respective end position of the piston is here often not defined precisely. It has also already been proposed to use a working medium in a pressure space to damp an end stop of a piston or a piston rod.

DE 195 43 646 A1 discloses an actuator of a pneumatic shift device for a transmission. The actuator has a cylinder containing a piston rod with a sliding piston that can be pneumatically loaded on both sides. The piston rod is connected to a shift mechanism of the transmission. Arranged in the piston is a linearly movable slider which, before reaching an end position, opens a through-flow channel in the piston so as to balance the pressure in the pressure chambers on either side of the piston, whereby a damping effect is achieved.

DE 10 2009 029 038 A1 describes an actuator of a shift device of a vehicle transmission in which a piston unit with a piston rod is arranged so as to slide in a pressure cylinder. The piston divides the pressure cylinder into two variable pressure chambers. The two pressure chambers can be alternately loaded with compressed air or purged via a compressed air supply, depending on the direction of the movement of the piston unit. The piston unit has an annular outer piston, within which a sliding inner piston is arranged which is connected to the piston rod and can execute an additional stroke relative to the outer piston, wherein the stroke of the inner piston relative to the outer piston is limited by stop discs. The stroke of the outer piston is limited by stop faces on the pressure cylinder. To damp the impact of the outer piston on the stop faces, the outer piston has damping attachments which reduce the stop noise and damp the impact.

DE 10 2014 018 631 A1 discloses an actuator for moving a shift lever in a transmission, with a pneumatically movable piston rod with an assigned piston with at least one pneumatically loadable pressure chamber. The piston rod has an end position damping. At an end of the piston rod facing away from the piston, the piston rod has a head with which it extends into a further pressure chamber. On movement of the piston head into the pressure chamber, the pressure in the latter increases so that the movement of the piston rod is damped. A line with a magnetic valve adjoins the pressure chamber on the piston head side. By opening or closing the magnetic valve, the pressure in the pressure chamber on the piston head side can be adjusted. The cross-section of the connecting line only contributes a fraction of an effective diameter of the piston rod head.

SUMMARY

In this context, the present disclosure is based on the object of refining an actuator for an automated or automatic transmission of the type cited initially, i.e. with an end stop damping device for damping an end stop of the piston unit, with regard to wear-free and noiseless shift processes with short shift times. In particular, when the actuator is activated, the piston movement should be decelerated, in particular in its end phase, with a minimally increased duration of the shift time, and the piston unit should assume its proposed position on reaching the end stop as precisely as possible, ideally without springing back. A further object of the present disclosure is to propose a method for controlling such an actuator. In particular, such an actuator which may be controlled with such a method should be suitable for use in an automated or automatic vehicle transmission in a drive train of a motor vehicle.

The present disclosure is based on the knowledge that, with an end stop damping device of a generic actuator in which, on reaching an end stop, a piston is braked purely mechanically, because of the required high travel speeds of the piston, a powerful impact can occur, whereby components concerned may be disadvantageously mechanically loaded. When the piston is braked by means of an elastic buffer with a high impact speed, the piston can also spring back in the opposite direction and then remain in an undefined end position. Secondly, the braking operation purely by means of fluid, wherein the piston ideally has an end speed of zero on reaching its end position, cannot be achieved without significantly extending the shift time. This is the case in particular if a counter-pressure countering the piston movement increases too sharply and significantly decelerates the piston.

Such damping measures may be used individually but cannot bring a piston to bear on its end stop as rapidly, gently and precisely as a dual-stage damping, in which a variable pneumatic damping stage on the approach to the end stop may be combined in a targeted fashion with a mechanical damping stage in the final part, in particular the final millimeter of the piston movement. A combination of two different damping stages in a piston of an actuator however brings a substantial advantage with respect to wear-reduction in the end stop speed and a reduction in the end stop noise, and in mitigating an increase of the shift time by the damping.

The present disclosure is therefore based on an actuator for an automated or automatic transmission, which comprises a cylinder housing, a piston unit and a piston rod, wherein the piston unit is coupled to the piston rod and arranged movably in the cylinder housing along an axial longitudinal axis, wherein the piston unit separates from each other two pressure chambers of variable volume in the cylinder housing, by means of which the piston unit can be loaded with compressed air on both sides, wherein the two pressure chambers are connected to a valve unit which is able to switch the pressurization or purging of each of the two pressure chambers, and wherein an end stop damping device for damping at least one end stop of the piston unit is arranged in the actuator.

To achieve the device-related object, the present disclosure proposes that the end stop damping device is formed in two stages, namely with a first pneumatically active damping stage and with a second mechanically active damping stage, that by means of the pneumatic damping stage the kinetic energy of the piston unit in at least one movement direction thereof coaxially to the longitudinal axis can be reduced, on approach of the piston unit to an end stop face formed on the cylinder housing, by means of a pneumatic damping element, that the pneumatic damping element has an air outlet with a variable flaw through capacity for the compressed air, which can be pneumatically connected to one of the two pressure chambers by switching of the valve unit into a purge position, wherein the active cross-sectional area of the air outlet can be adjusted variably depending on the pressure in the pressure chamber connected thereto, and wherein by means of the mechanical damping stage, a kinetic energy of the piston unit remaining after braking by the pneumatic damping element, when it reaches the end stop face, can be dissipated by means of a mechanical damping element.

A piston unit may consist of one piston or several pistons, for example a main piston and two auxiliary pistons which can execute movements relative to each other. A piston movement along a longitudinal axis may be a movement of an individual piston or a common movement of several pistons of a piston unit in the direction of or coaxial to their longitudinal axes, for example, a common movement of the main piston and an auxiliary piston mounted radially thereon.

The present disclosure proposes braking a movement of a piston unit of an actuator towards an axial end position in two temporally successive, active damping stages. A pneumatic damping is responsible for the majority of the deceleration of the piston movement. A subsequent mechanical damping absorbs the residual kinetic energy of the piston unit. Accordingly, a first damping stage comprises a variable pneumatic damping and consists of initially generating a counter-pressure in the pressure space on the opposite side to the piston movement. This ensures that initially only a relatively small air mass flow is released from the pressure chamber for purging, so that by compression of the air on the piston movement into this pressure chamber, a pressure rise is created. Firstly, it is desirable to achieve as high a counter-pressure as possible in order to obtain a high damping effect. Secondly however, it is also desirable to purge the pressure chamber within a specific time, in order to reach the end position of the piston unit in the required time and exclude a premature stoppage or even a return movement of the piston unit due to an excessive counter-pressure. Therefore in the actuator according to the invention, the pressure rise in the pressure chamber is limited in that a larger cross-sectional area for an air outlet from the air outlet opening is only opened when the counter-pressure becomes too high. The larger cross-sectional area of the air outlet from the air outlet opening then allows a correspondingly higher air mass flow for purging the respective pressure space. The increase in air mass flow for purging is however dimensioned such that the piston movement is still adequately braked in order to avoid a powerful impact of the piston on the cylinder housing in its end position.

The pneumatic damping accounts for the majority of the deceleration of the piston movement. This is followed by a mechanical damping stage. This may for example consist of simple rubber buffers or similar which, by elastic deformation, absorb the residual energy of the piston movement without causing the piston unit to spring back perceptibly. Both damping stages are functional individually, but the two-stage end stop damping with successive pneumatic and mechanical damping stages allows the desired improvement of the actuator in a particularly advantageous fashion.

The effectiveness of the present disclosure has already been verified in a computer simulation of such a two-stage end stop damping device according to the invention, which simulated the different time-dependent or travel-dependent counter-pressure curves of a piston movement. This showed that, according to the invention, by a suitably configured combination of a pneumatic damping stage with counter-pressure limitation and a mechanical damping stage, a substantial advantage can be achieved with respect to reducing an end stop speed and reducing a clattering noise at the end stop of the piston, without causing significant shift time increases due to the piston damping. This is evident in particular in comparison with the existing actuators on the market, with systems which only work with one of the two said piston damping methods and/or only provide a non-variable damping of a piston or piston rod.

The present disclosure has succeeded in proposing an actuator for an automated or automatic transmission which reduces the impact loading on the gear components of a transmission and on the actuator itself. The maximum usage period in particular of the shift device of the transmission is thus not limited by such loads. Also, the noise level on shift processes is reduced, whereby the operating comfort of the transmission is increased. This can be achieved without a perceptible extension in the shift times for changing gears in an automated or automatic transmission. The piston damping also causes no or only marginal additional torque losses because of interruptions in tractive force during the shift processes. The performance of the drive train is thus not, or at least not perceptibly, reduced by the damping of the piston movement.

According to a preferred embodiment of an actuator configured according to the invention, it is provided that the end stop damping device is configured or is effective for both directions of movement of the piston unit coaxial to the longitudinal axis, wherein the pneumatic damping stage comprises a first pneumatic damping element for a first movement direction coaxially to the longitudinal axis, and a second pneumatic damping element for a second movement direction coaxially to the longitudinal axis, which elements are assigned to the valve unit, and that the mechanical damping stage comprises a first mechanical damping element for the axial stop of the piston unit at a first end stop face of the cylinder housing and a second mechanical damping element for the stop of the piston unit at an opposite, second end stop face of the cylinder housing, which elements are arranged on the piston unit.

Because pneumatic and mechanical damping elements are provided for both pressure chambers, an advantageous two-stage damping of the piston unit is achieved in both possible linear travel or shift directions of the actuator.

According to a further refined embodiment of the actuator according to the invention, it may be provided that the first pneumatic damping element can be switched by a first 3/2-way magnetic valve of the valve unit, that the second pneumatic damping element can be switched by a second 3/2-way magnetic valve of the valve unit, that the two pneumatic damping elements each have an air outlet flap formed as an elastic lip a spring lip, which is arranged on a first or second outlet opening of a first or second air outlet that can be connected to the first pressure chamber or the second pressure chamber respectively. Here, the respective air outlet flap is attached unilaterally to the first or second air outlet opening such that the respective air outlet flap normally lies tightly under spring preload on the assigned air outlet opening and, by overcoming the spring preload, lifts away from the respective air outlet opening on the pressurization of the respective air outlet flap from the first pressure chamber or second pressure chamber when a pressure threshold value is exceeded. Also, it is provided that the two air outlet flaps each also have a permanently open passage opening, wherein a third active cross-sectional area or a fourth active cross-sectional area of the first passage opening or the second passage opening, respectively is substantially smaller than a first active cross-sectional area or a second active cross-sectional area of the air outlet opening which can be opened pressure-dependently by the first air outlet flap or the second air outlet flap, respectively, wherein these air outlet openings which can be opened pressure-dependently are substantially smaller than a fifth active cross-sectional area or a sixth active cross-sectional area of the piston unit.

With this arrangement, a simple purging device with a variable outflow cross-section is created for the respective piston pressure chambers. Accordingly, a respective 3/2-way magnetic valve of the valve unit has connections for a compressed air supply, for a pressure chamber and for a pneumatic damping element with an air outlet flap which is spring-preloaded in the closing direction. In a first switch position of this magnetic valve, the pressure chamber may be loaded with compressed air from a supply line. In a second switch position, the compressed air supply may be blocked and the pneumatic damping element connected to the pressure chamber for purging.

The pneumatic damping element has a permanent opening via which a pressure balance with the atmosphere can be created. When the piston of the actuator moves into the pressure chamber due to pressurization of the opposite pressure chamber, the pressure therein increases since the permanent passage opening or purge opening has a smaller active cross-section than the piston reducing the active pressure space. Accordingly, an initially rising counterforce is created, which is directed against the piston movement and damps this. However, as soon as the pressure force in the pressure chamber can overcome the spring force of the air outlet flap, this opens a larger air outlet opening and the purge mass flow suddenly increases, so that the counterforce falls and the movement of the piston is less damped. If the pneumatic pressure on the air outlet flap falls below the spring force, the air outlet flap would close again. In the purge position therefore, depending on the pressure in the connected pressure space, either a small specific cross-sectional area or a large specific cross-sectional area is active for the outflow of compressed air. The result is a self-regulating damping of the piston movement. At a time at which the air outlet flap would close again, the piston may have reached or almost reached its proposed end position.

The design of the air outlet flap with a spring lip attached unilaterally to the air outlet opening is structurally simple, compact and cheap to produce. The person skilled in the art may also find other outlet flaps which fulfil the described function. Thus, an air outlet flap is also possible in which the active cross-sectional area changes in more than two stages or continuously, depending on the pressure applied thereto.

According to a further embodiment of the invention, it may be provided that the piston unit has a radially inner main piston fixedly connected to the piston rod, that the main piston carries a first auxiliary piston assigned to the first pressure chamber and a second auxiliary piston assigned to the second pressure chamber, that the auxiliary pistons are arranged radially above the main piston and with limited displaceability relative thereto and coaxially to the longitudinal axis, that for stopping the piston unit on the first end stop face of the cylinder housing, a first mechanical damping element, formed as a rubber buffer, is arranged on the first auxiliary piston at the end opposite the first end stop face of the cylinder housing, and that for stopping the piston unit at the second end stop face of the cylinder housing, a second mechanical damping element, formed as a rubber buffer, is arranged on the second auxiliary piston at the end opposite the second end stop face of the cylinder housing.

In this exemplary embodiment of an actuator, accordingly a main piston is provided which is connected to a piston rod. The piston and hence the piston rod are moved in each pressure chamber via an auxiliary piston which initially carries the main piston with it on pressurization. The movement of the auxiliary piston ends at an adjustment travel limiter which is part of the actuator housing, or at a stop body attached thereto. From this position, the also pressurized main piston carries the axially opposing auxiliary piston with it up to the end stop. In this arrangement, it is useful to attach the mechanical damping stage according to the present disclosure directly to the auxiliary piston. This may be a simple rubber buffer for each auxiliary piston which protrudes at the end, so that only a small dead volume remains between the main piston in its end position and the surrounding cylinder housing, and the main piston does not bear directly on a housing wall. This facilitates the further movement of the piston in the opposite direction from its end position, and avoids wear due to direct superficial contact between the adjacent non-elastic surfaces. For pistons of different design, the person skilled in the art may easily adapt the mechanical damping element and its arrangement to the respective structural circumstances. According to the present disclosure a mechanical damping element is able to absorb a residual kinetic energy of the piston which remains after the pneumatic damping.

It may furthermore be provided that the two pneumatic damping elements are combined in a valve block of the valve unit. In particular, the air outlet may be arranged at an outlet of the valve block. This achieves a particularly compact design of the actuator or associated valve unit, in which the respective pneumatic damping element takes up only a small additional installation space. The two pneumatic damping elements may also be integrated directly in at least one assigned 3/2-way magnetic valve of the valve unit. The design of damping element may thus be easily adapted to the structural conditions of the valve unit.

It may also be provided that an effective dead volume, which remains in an end position of the piston unit and includes a free volume in the region between the piston unit and the first or second end stop face in the respective pressure chamber, and a volume of a pneumatic connection between the respective pressure chamber and the assigned air outlet opening of the respective pneumatic damping element, is designed to be minimal. As small a dead volume as possible is advantageous for a two-stage end stop damping device with pneumatic and subsequent mechanical damping, in order to be able to define and set precisely the travel-dependent damping curve for the two damping stages.

As outlined initially, the present disclosure also relates to a method for controlling an actuator of an automated or automatic transmission, wherein the actuator comprises an end stop damping device of the type outlined initially for damping an end stop of a piston unit.

To achieve the method-related object, the present disclosure proposes that one of two pressure chambers separated from each other by the piston unit in a cylinder housing is loaded with a positive pressure, and the other of the two pressure chambers is simultaneously purged so that the pressure difference drives the piston unit coaxially along the longitudinal axis. Further, a two-stage damping takes place for damping an end stop of the piston unit at an end stop face in the actuator.

First, in a pneumatic damping stage, when the piston unit approaches the end stop face, a self-regulating counter-pressure countering the piston movement is produced by a pneumatic damping element in the one of the two pressure chambers that is to be purged, wherein the size of an active cross-sectional area of an air outlet of the pneumatic damping element pneumatically connected to the pressure chamber, is automatically adjusted depending on the prevailing pressure.

Then, by using a mechanical damping stage on reaching the end stop face, the remaining kinetic energy of the piston unit is dissipated by elastic deformation of a mechanical damping element.

This method requires no specific actuation of the end stop damping device. This rather works autonomously in that initially a counter-pressure is built up which damps the piston movement. The counter-pressure is automatically limited in that, because of the counter-pressure itself, a larger air outlet area is opened when this exceeds a predefined pressure limit value. The piston is thus effectively braked but simultaneously, while meeting the switching time requirements, is still guided into its end position sufficiently quickly since it then discharges its residual energy gently by deformation of an elastic buffer.

According to one embodiment of this method, it may be provided that a temporal curve of the air mass flow of a respective purging of the respective pressure chamber, and a temporal curve depending thereon of an adjustment travel of the piston unit, are at least approximately established via a dimensioning, previously determined by calculation using a simulation algorithm, of the first air outlet or second air outlet, wherein the active cross-sectional areas of the permanently open first or second passage opening and the pressure-dependently open first or second air outlet opening, and the spring preload active in the closing direction of the first or second air outlet flap, are matched to each other taking into account a predefined pressure level of a compressed air supply.

The structural design of the cross-sectional areas of the passage opening and the air outlet opening, and the spring preload with which the air outlet flap bears on the air outlet opening, may thus be matched to each other and to a predefined pressure level of the compressed air supply such that a desired pressure curve results for the purging and hence the damping of the piston movement. In this way, the movement curve of the piston can be temporally optimized by simple means, and at the same time a force with which the piston meets its end stop surface can be limited.

Finally, the present disclosure also relates to an automated or automatic transmission in a drive train of a motor vehicle, with at least one actuator which is configured as claimed in at least one of the device claims and can be controlled as claimed in at least one of the method claims.

The present disclosure is now explained in more detail below with reference to an exemplary embodiment shown in the attached drawings.

DETAILED DESCRIPTION OF THE DRAWINGS

Figure 1:
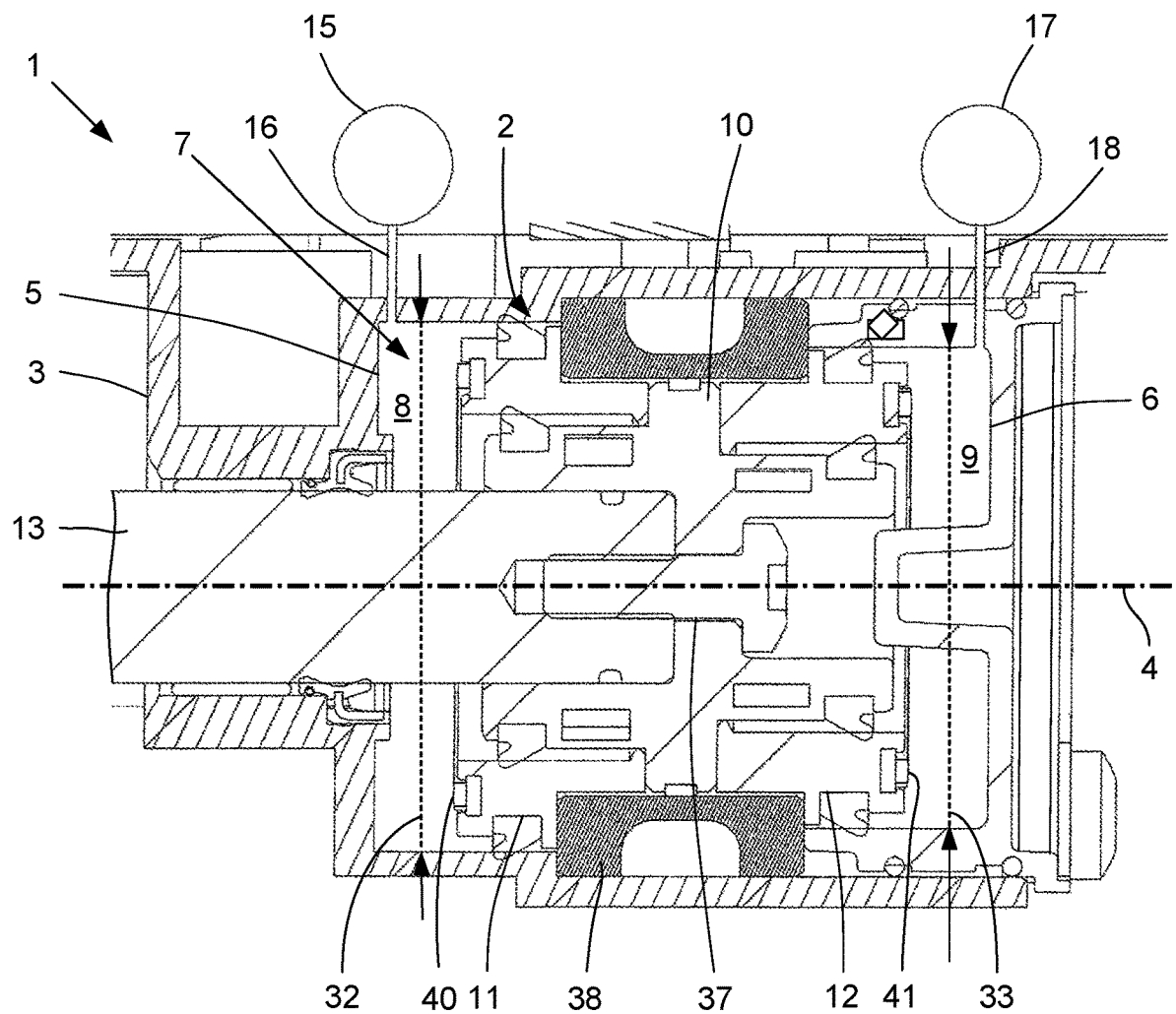
FIG. 1 shows a schematic, longitudinal cross-section through a piston unit in a partial view in a neutral position in an actuator.
Figure 2:
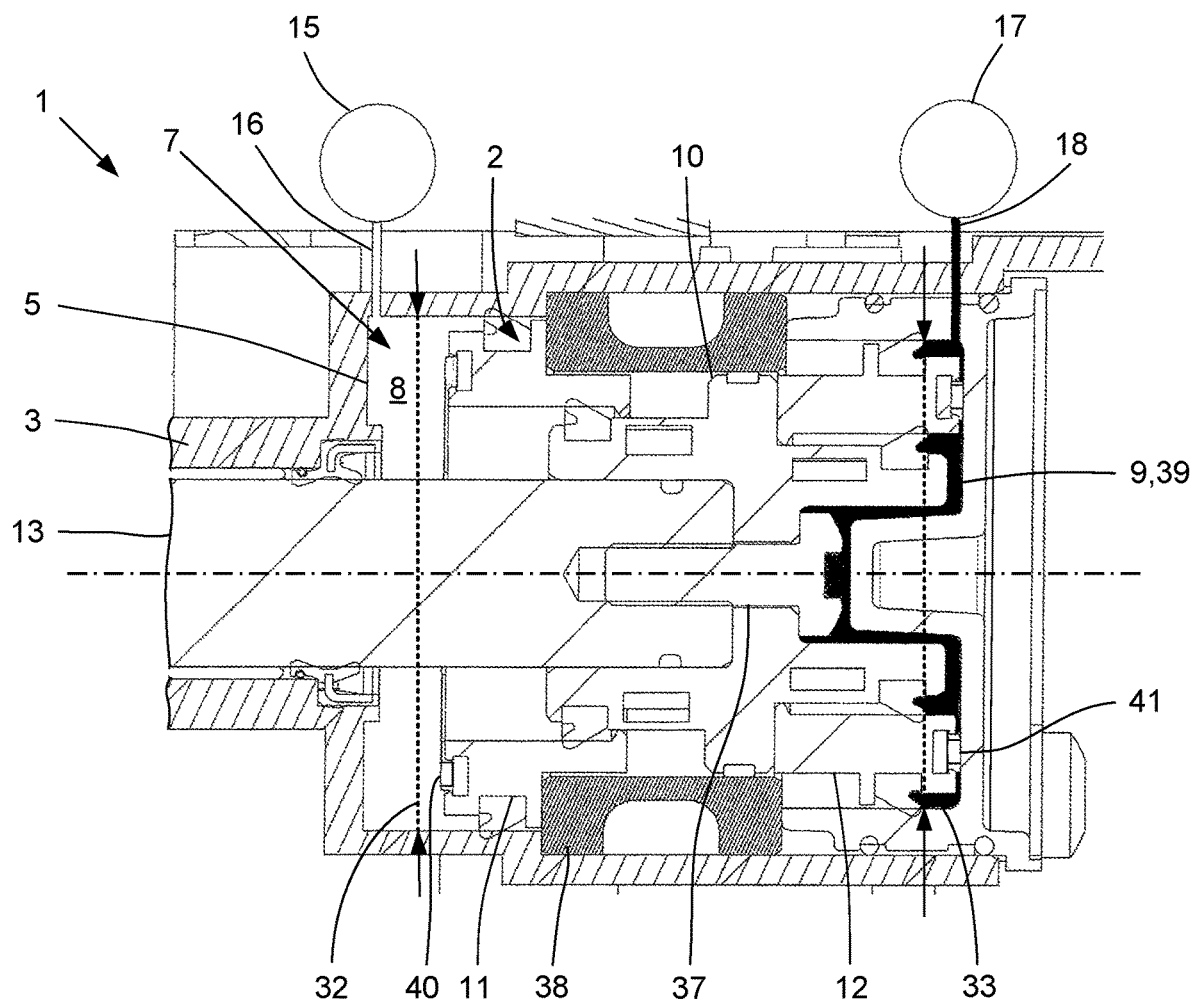
FIG. 2 shows the piston unit of FIG. 1 in an end position.

Accordingly, an actuator 1 shown in FIG. 1 and FIG. 2 of an automated transmission comprises a piston unit 2, configured as a shift piston, which is arranged to slide coaxially with a longitudinal axis 4 in a cylinder housing 3, formed as a shift cylinder. The piston unit 2 moves in a piston chamber 7 of the cylinder housing 3 between a first end stop face 5 and a second end stop face 6, wherein the piston unit 2 divides the piston chamber 7 into two pressure chambers 8, 9 which can be loaded with compressed air and are sealed against each other. The piston unit 2 consists of a main piston 10 and two auxiliary pistons 11, 12. A piston rod 13 is attached to the main piston 10 and is mounted so as to slide in the cylinder housing 3 and is guided along the longitudinal axis 4. The connection between the main piston 10 and the piston rod 13 is configured for example as a second screw connection 37.

The piston rod 13 is in engagement with or actively connected with a shift element of a shift clutch, for example a sliding collar (not shown), in the known fashion. The two auxiliary pistons 11, 12 are mounted sliding radially outside and coaxially to the main piston 10 and are axially displaceable relative thereto, wherein the first auxiliary piston 11 is arranged in the first pressure chamber 8 and the second auxiliary piston 12 is arranged in the second pressure chamber 9. The maximum adjustment travels of the two auxiliary pistons 11, 12 are approximately the same, and are limited by an annular travel-limiting component 38 arranged approximately centrally in the piston chamber 7. The first auxiliary piston 11 may thus move between the first end stop face 5 and one of the end faces of the travel-limiting component 38, and the second auxiliary piston 12 may move between the second end stop face 6 and the other end face of the travel-limiting component 38.

To damp the end stop of the piston unit 2 on the first end stop face 5 of the cylinder housing 3, a first mechanical damping element 40, formed as a rubber buffer, is mounted on the end face of the first auxiliary piston 11 facing the first end stop face 5. To damp the end stop of the piston unit 2 on the second end stop face 6 of the cylinder housing 3, a second mechanical damping element 41, formed as a rubber buffer, is attached to the end face of the second auxiliary piston 12 facing the end stop face 6. The two mechanical damping elements 40, 41 protrude beyond the end faces of the respective auxiliary pistons 11, 12. Each of the two mechanical damping elements 40, 41 is therefore active in one adjustment direction of the piston unit 2 as a mechanical damping stage of a two-stage end stop damping device of the piston unit 2.

Figure 3:
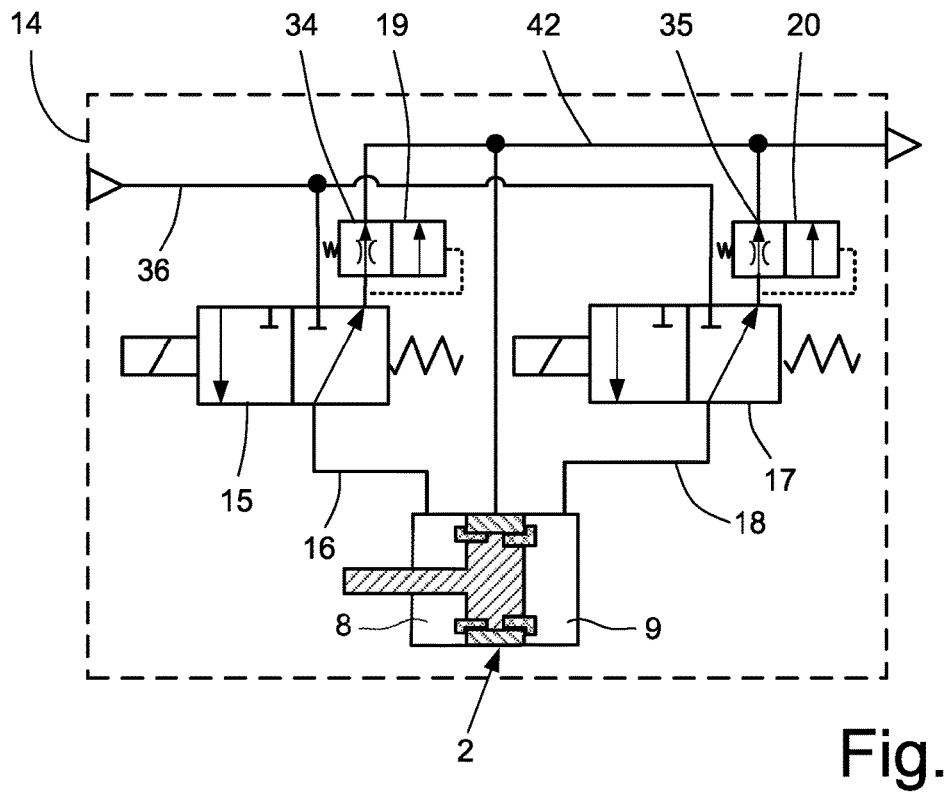
FIG. 3 shows a circuit diagram of a valve unit for controlling and damping the end position of the piston unit of FIG. 1 and FIG. 2.

The two pressure chambers 8, 9 of the piston chamber 7 are connected to a valve unit 14 (FIG. 3). The valve unit 14 has a first 3/2-way magnetic valve 15 which is connected to the first pressure chamber 8 via a first pneumatic connecting line 16, and a second 3/2-way magnetic valve 17 which is connected to the second pressure chamber 9 via a second pneumatic connecting line 18. The two pressure chambers 8, 9 can be connected to a compressed air supply 36 via the two magnetic valves 15, 17, as indicated merely by one pneumatic connecting line in FIG. 3. For purging to the environment, the two pressure chambers 8, 9 can be connected to a purge line 42 via the two magnetic valves 15, 17.

As FIG. 3 furthermore shows, the valve unit 14 has a first pneumatic damping element 19 which is pneumatically connected to the first 3/2-way magnetic valve 15. Also, a second pneumatic damping element 20 is present, which is pneumatically connected to the second 3/2-way magnetic valve 17. Each of the two pneumatic damping elements 19, 20 is active in one adjustment direction of the piston unit 2 as a pneumatic damping stage of the two-stage end stop damping device of the piston unit 2.

Figure 4:
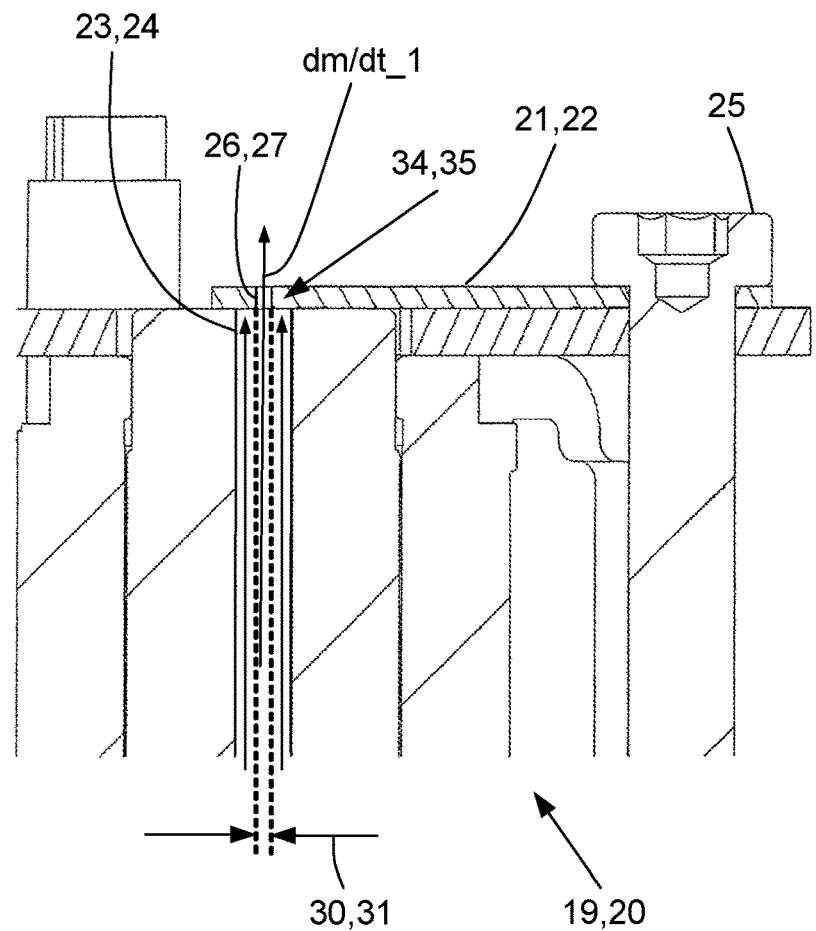
FIG. 4 shows an enlarged detail of a pneumatic damping element of a valve unit from FIG. 3 with an air outlet flap in a first operating position.
Figure 5:
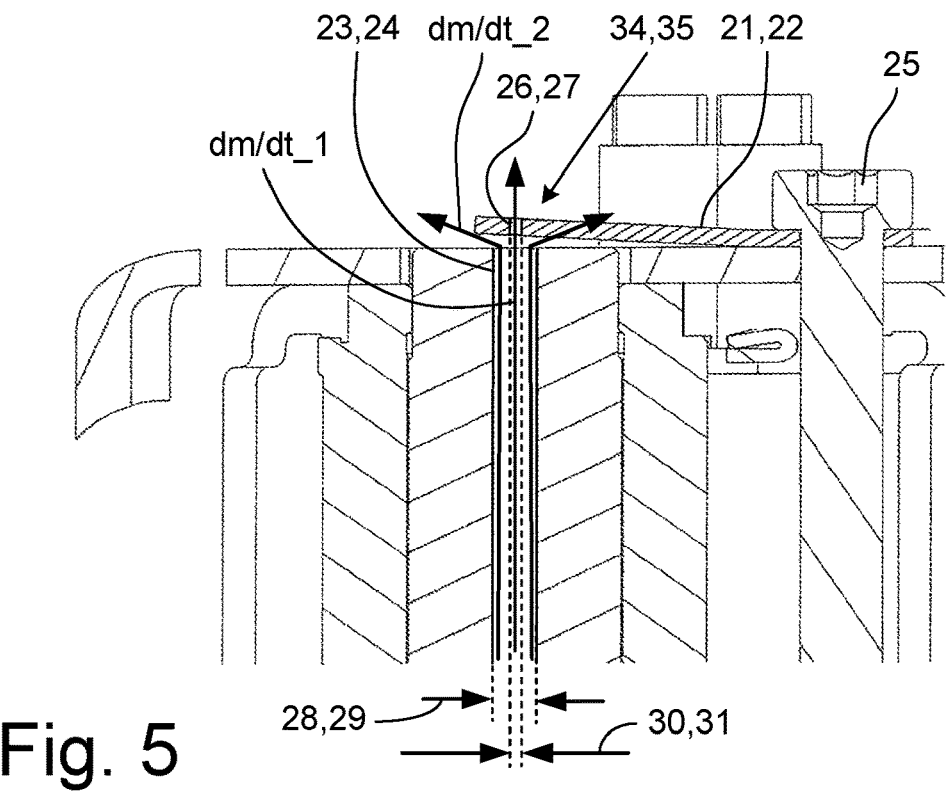
FIG. 5 shows the detail of FIG. 4 with the air outlet flap in the second operating position.

The two pneumatic damping elements 19, 20 may be integrated in a valve block (not shown further) which also receives the two 3/2-way magnetic valves 15, 16. Since they are configured identically, it is sufficient to describe in more detail one of the two pneumatic damping elements 19, 20. FIG. 4 and FIG. 5 each show a detail extract of one of the two pneumatic damping elements 19, 20. The double reference signs apply accordingly to the first pneumatic damping element 19 or the second pneumatic damping element 20. Accordingly, the first/second pneumatic damping element 19, 20 has a first/second air outlet flap 21, 22 formed as an elastic lip, which bears under preload in the closing direction on a first/second air outlet opening 23, 24 of a first/second air outlet 34, 35. For this, at one end, the air outlet flap 21, 22 is clamped between a first screw connection 25 and the body of the pneumatic damping element 19, 20. The first/second air outlet flap 21, 22 has a first/second passage opening 26, 27 configured as a bore, which in contrast to the first/second air outlet opening 23, 24 cannot be closed but is permanently open. The size ratios of the piston unit 2, air outlet flap 21, 22 and passage opening 26, 27, are designed such that a first/second active cross-sectional area 28, 29 of the first/second air outlet opening 23, 24 is substantially larger than a third/fourth active cross-sectional area 30, 31 of the first/second passage opening 26, 27, but substantially smaller than a fifth/sixth active cross-sectional area 32, 33 of the piston unit 2 (FIG. 1 and FIG. 2). The latter two cross-sectional areas 32, 33 are defined by the respective, pneumatically active end faces of the piston unit 2 on the pressure chamber side.

The function of the piston unit 2 with the end stop damping device described is as follows:

In the operating situation shown in FIG. 1, the piston unit 2 is in a neutral position and therefore positioned centrally in the piston chamber 7. The two auxiliary pistons 11, 12 are situated at the respectively assigned end face of the travel-limiting component 38. The main piston 10 lies between the auxiliary pistons 11, 12. The two 3/2-way magnetic valves 15, 17 of the valve unit 14 (FIG. 3) are switched to the same one of two possible switch positions, here a purge position. The two pressure chambers 8, 9 are purged via the associated pneumatic damping elements 19, 20, or more precisely via the passage openings 26, 27 of the air outlet flaps 21, 22 at the air outlets 34, 35 of the pneumatic damping elements 19, 20 (FIG. 4). In this operating situation, a pressure balance takes place between the pressure chambers 8, 9 and the surrounding atmosphere.

In order to move the piston rod 13 for example to the right from the position shown in FIG. 1, the first pressure chamber 8 is loaded with compressed air. For this purpose, the first 3/2-way magnetic valve 15 is switched into its other switch position, here a pressure position. In this pressure position of the first 3/2-way magnetic valve 15, the first pressure chamber 8 is pneumatically connected to a compressed air supply 36. The main piston 10 begins to move and carries the attached piston rod in the same movement direction coaxially to the longitudinal axis 4 (to the right in the viewing direction). In doing so, the main piston 10 pushes the second auxiliary piston 12, i.e. the auxiliary piston in the opposite second pressure chamber 9, before it in the direction towards the second end stop face 6. The first auxiliary piston 11 remains stationary at the travel-limiting component 38.

The second 3/2-way solenoid valve 17 remains in the purge position so that the second pressure chamber 9 is purged. On purging of the second pressure chamber 9, the pneumatic damping stage of the two-stage end stop damping device of the piston unit 2 becomes active. This is illustrated in the simulation diagrams in FIG. 6 and FIG. 7a-c. In the diagrams, the movement of the piston unit 2 is represented by the adjustment travel of a sliding collar. This is equivalent to a movement of the piston unit 2, so that for simplification, the description below refers to a piston movement.

Figure 6:
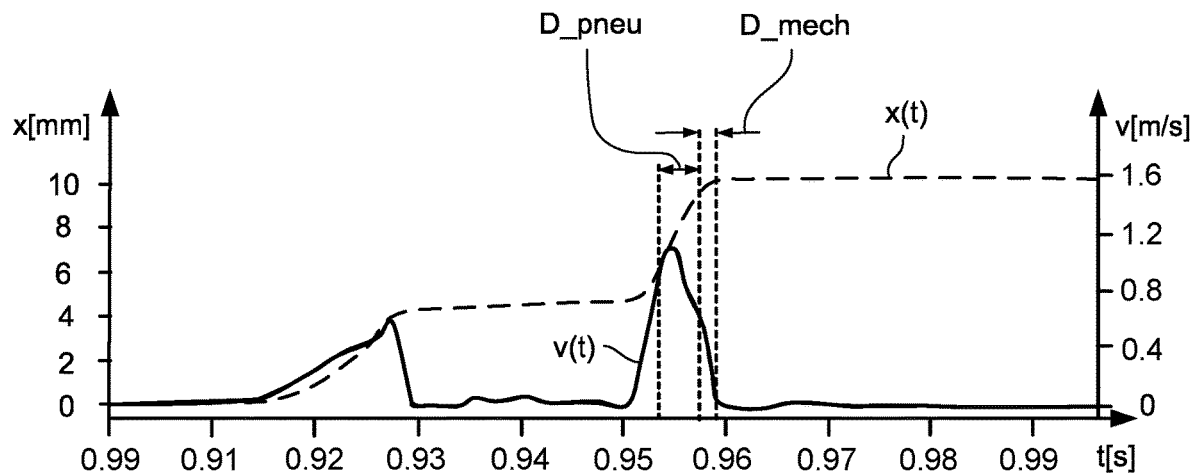
FIG. 6 shows a combined travel-time diagram and speed-time diagram of a shift collar actuated by a piston unit in an automated transmission, with a two-stage end position damping of the piston unit according to the invention.
Figure 7:
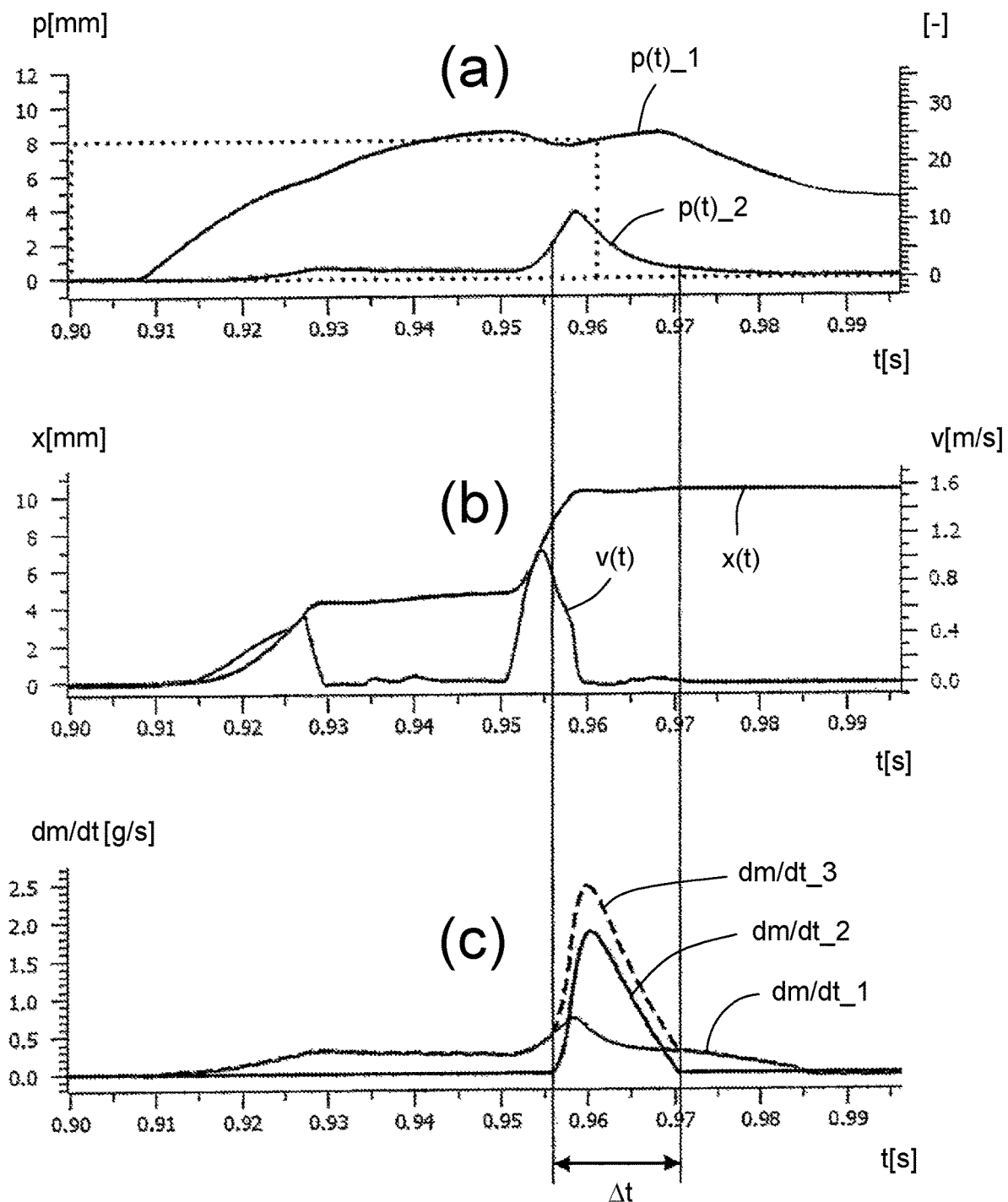
FIG. 7*a* shows a pressure-time diagram of the pressures in two pressure chambers of the piston unit on actuation of the shift collar of FIG. 6.
FIG. 7*b* shows the diagram according to FIG. 6 for comparison.
FIG. 7*c* an air mass flow-time diagram of purging of a pressure chamber via the valve unit of FIG. 3 and according to FIGS. 4 and 5.

FIG. 6 and FIG. 7b show the temporal travel curve x(t) of a piston movement and an associated speed curve v(t) of this piston movement. FIG. 7a shows an associated temporal pressure curve p_1(t) of the pressurization of the first pressure chamber 8, and a counter-pressure curve p_2(t) of the purging of the second pressure chamber 9. Also, the associated respective switch positions of the first 3/2-way magnetic valve 15 (pressurization of pressure chamber 8) and the second 3/2-way magnetic valve 17 (purging of pressure chamber 9) are shown. FIG. 7c shows, for purging of the second pressure chamber 9, an associated temporal curve dm/dt_1 of a first air mass flow through the passage opening 27 in the air outlet flap 21, 22, a temporal curve dm/dt_2 of a second air mass flow through the air outlet opening 24, and a resulting temporal curve of a total air mass flow dm/dt_3=dm/dt_1+dm/dt_2 of the purging.

Accordingly, the pressure p(t)_1 in the first pressure chamber 8 rises due to pressurization by means of the compressed air supply 36 (FIG. 7a). In the second pressure chamber 9 to be purged, initially only the small cross-sectional area 30 of the passage opening 26 of the air outlet 34 is active. The air outlet flap 21 lies preloaded in the closing direction against the air outlet opening 23 and closes this. Since the piston unit 2 moves into the second pressure chamber 9, the air therein is compressed and the pressure p(t)_2 increases, since the air mass flow dm/dt_1 for purging is limited by the cross-sectional area 30 of the passage opening 26 in the air outlet flap 21, which is small in comparison with the cross-sectional area 32 of the piston unit 2 (FIG. 7c).

The pressure p(t)_2 in the second pressure chamber 8 acts as a counter-pressure which reduces the piston speed v(t) and thereby damps the piston movement (FIG. 7b). The counter-pressure then exceeds the spring preload of the air outlet flap 21 and opens this, so that the larger cross-sectional area 29 of the air outlet opening 24 is activated and effective in a time window Δt. Correspondingly, purging is intensified by the larger air mass flow dm/dt_2. As a result, the piston unit 2 is accelerated and quickly reaches the second end stop face 6 (FIG. 2). Here, by impact of the second auxiliary piston 12 on the first end stop face 5, the mechanical damping stage becomes active. The mechanical damping element 41 formed as a rubber buffer is elastically deformed and thereby converts the residual kinetic energy of the piston unit 2 into heat, so that this remains in its end position. In this end position of the piston unit 2, the second pressure chamber 9 is almost completely purged. Only a small dead volume 39 (shown filled in black in FIG. 2) remains in the second pressure chamber 9.

While the above description constitutes the preferred embodiments of the present invention, it will be appreciated that the invention is susceptible to modification, variation and change without departing from the proper scope and fair meaning of the accompanying claims.

What is claimed is:

1. An actuator (1) for an automated or automatic transmission, the actuator comprising:
   a cylinder housing (3), a piston unit (2), an end stop damping device, and a piston rod (13),
   wherein the piston unit (2) is coupled to the piston rod (13) and arranged in the cylinder housing (3) to be movable in two opposite directions along a longitudinal axis (4),
   wherein the piston unit (2) separates two pressure chambers (8, 9) of variable volume in the cylinder housing (3), the pressure chambers being configured to apply pressure to the piston unit (2) with compressed air from opposite sides,
   wherein the two pressure chambers (8, 9) are configured to be connected to a valve unit (14) configured to selectively switch between a pressurization or a purge of each of the two pressure chambers (8, 9), and
   wherein the end stop damping device is arranged in the actuator (1) for damping at least one end stop of the piston unit (2) and is composed of a first pneumatically active damping stage and a second mechanically active damping stage,
   wherein the first pneumatically active damping stage is configured to reduce the kinetic energy of the piston unit (2) in at least one movement direction thereof when the piston unit (2) approaches at least one of two opposite end stop faces (5, 6),
   wherein the first pneumatically active damping stage is formed on the cylinder housing (3) by a pneumatic damping element (19, 20), wherein the pneumatic damping element (19, 20) has an air outlet (34, 35) with a variable cross-sectional area for compressed air, which is configured to be pneumatically connected to a respective one of the two pressure chambers (8, 9) by switching the valve unit (14) into a purge position for the respective one of the two pressure chambers (8, 9), wherein the cross-sectional area (28, 29) of the air outlet (34, 35) is adjustable by a prevailing pressure in the respective pressure chamber (8, 9) connected thereto, and
   wherein the second mechanically active damping stage is configured to dissipate a kinetic energy of the piston unit (2) remaining after braking by the pneumatic damping element (19, 20), when the piston unit (2) reaches the at least one end stop face (5, 6),
   wherein the second mechanically active damping stage becomes active upon impact on at least one of the at least one end stop face (5, 6) and includes at least one mechanical damping element (40, 41) formed as a rubber buffer arranged on the piston unit at a piston end proximate to one of the at least one end stop face (5, 6) of the cylinder housing (3).

2. The actuator as claimed in claim 1, wherein the end stop damping device is operative for both opposite directions of movement of the piston unit (2),
- wherein the first pneumatically active damping stage comprises a first pneumatic damping element (19) for a first movement direction of the two opposite directions, and a second pneumatic damping element (20) for a second movement direction of the two opposite directions, the first and second pneumatic damping elements being assigned to the valve unit (14), and
- wherein the second mechanically active damping stage comprises a first mechanical damping element (40) for stopping the piston unit (2) at a first end stop face (5) of the two end stop faces and a second mechanical damping element (41) for stopping the piston unit (2) at an opposite second end stop face (6) of the two end stop faces, the first and second mechanical damping elements being arranged on the piston unit (2).

3. The actuator as claimed in claim 2, wherein the first pneumatic damping element (19) is configured to be controlled by a first 3/2-way magnetic valve (15, 17) of the valve unit (14), that the second pneumatic damping element (20) is configured to be controlled by second 3/2-way magnetic valve (15, 17) of the valve unit (14) wherein the first and second pneumatic damping elements (19, 20) each have an air outlet flap (21, 22) formed as an elastic lip arranged on a first or second outlet opening (23, 24) of a first or second air outlet (34, 35) respectively connected to the first pressure space (8) or the second pressure space (9) via the first or the second 3/2-way magnetic valve,
- wherein the air outlet flap (21) is attached unilaterally to an associated one of the first and second air outlet openings g (23, 24) such that the air outlet flap (21, 22) lies under spring preload on the associated air outlet opening (23, 24) under atmospheric pressure and by overcoming the spring preload, lifts away from the respective air outlet opening (23, 24) on pressurization of the air outlet flap (21, 22) from the first or second pressure chamber (8, 9) when a pressure threshold value is exceeded,
- wherein each of the two air outlet flaps (21, 22) includes a respective permanently open passage opening (26, 27), the passage opening having a cross-sectional area smaller than the respective air outlet opening (23, 24) associated with the air outlet flap (21, 22),
- wherein the air outlet openings (23, 24) which can be opened pressure-dependently are substantially smaller than a cross-sectional area (32) of the piston unit (2).

4. The actuator as claimed in claim 2, wherein the first and second pneumatic damping elements (19, 20) are combined in a valve block of the valve unit (14).

5. The actuator as claimed in claim 2, wherein the first and second pneumatic damping elements (19, 20) are directly integrated in a respective assigned 3/2-way magnetic valve (15, 17) of the valve unit (14).

6. The actuator as claimed claim 2, further comprising an effective dead volume (39), which remains in an end position of the piston unit (2) and includes a free volume in the region between the piston unit (2) and the first or second end stop face (5, 6) in the respective pressure chamber (8, 9), with a pneumatic connection between the respective pressure chamber (8, 9) and the assigned air outlet opening (23, 24) of the respective pneumatic damping element (19, 20).

7. The actuator as claimed in claim 1, wherein the piston unit (2) has a radially inner main piston (10) fixedly connected to the piston rod (13), wherein the main piston (10) carries a first auxiliary piston (11) assigned to a first pressure chamber (8) of the two pressure chambers and a second auxiliary piston (12) assigned to a second pressure chamber (9) of the two pressure chambers, that the first and second auxiliary pistons (11, 12) are arranged radially outward from the main piston (2) with respect to the longitudinal axis, with displaceability relative thereto and coaxial with the longitudinal axis (4), wherein the at least one mechanical damping element includes a first rubber buffer arranged on the first auxiliary piston (11) at a piston end proximate to the first end stop face (5) of the cylinder housing (3), and a second rubber buffer arranged on the second auxiliary piston (12) at a piston end proximate to the second end stop face (6) of the cylinder housing (3).

8. A method for controlling the actuator (1) as claimed in claim 1, the method comprising the following steps:
- pressurizing one of the two pressure chambers (8, 9), with a positive pressure (p(t)_1) and simultaneously purging the other of the two pressure chambers (9, 8) to drive a movement of the piston unit (2) coaxially to the longitudinal axis (4),
- performing a two-stage damping for damping the at least one end stop of the piston unit (2) at the at least one end stop face (5, 6) in the actuator (1), by first activating the first pneumatically active damping stage, via the pneumatic damping element (19, 20), when the piston unit (2) approaches at least one of the at least one end stop face (5, 6), by producing a self-regulating counter-pressure (p(t)_2) countering the piston movement in the one of the two pressure chambers (8, 9) that is to be purged, wherein the cross-sectional area (28, 29) of the air outlet (34, 35) of the pneumatic damping element (19, 20) is automatically adjusted by the prevailing pressure, and subsequently, when the piston unit reaches the end stop face (5, 6), dissipating the remaining kinetic energy of the piston unit (2) by elastic deformation of a mechanical damping element (40, 41) of the second mechanically active damping stage upon impact on the at least one of the at least one end stop face (5, 6).

9. An automated or automatic transmission in a drive train of a motor vehicle, with at least one actuator (1) as claimed in claim 1.

* * * * *